(12) United States Patent
Amirijoo et al.

(10) Patent No.: US 6,603,976 B1
(45) Date of Patent: Aug. 5, 2003

(54) ARCHITECTURE FOR TOA POSITIONING WITH LMU CONTROL FUNCTIONALITY IN BSC

(75) Inventors: Shahrokh Amirijoo, Richardson, TX (US); Bagher R. Zadeh, Solna (SE)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/365,681

(22) Filed: Aug. 3, 1999

(51) Int. Cl.[7] ................................. H04Q 7/34
(52) U.S. Cl. .................. 455/456; 455/436; 370/347; 342/357.1
(58) Field of Search .................. 370/347; 455/456, 455/457, 436, 440; 342/357.1

(56) References Cited

U.S. PATENT DOCUMENTS

| | | | |
|---|---|---|---|
| 6,161,018 A | * 12/2000 | Reed et al. | 455/456 |
| 6,470,185 B2 | * 10/2002 | Kangas et al. | 455/456 |
| 2001/0044311 A1 | * 11/2001 | Larsson et al. | 455/456 |

FOREIGN PATENT DOCUMENTS

| | | |
|---|---|---|
| WO | WO 98/52376 | 11/1998 |
| WO | WO 99/09778 | 2/1999 |
| WO | WO 99/37109 | 7/1999 |
| WO | WO 00/30397 | 5/2000 |

* cited by examiner

*Primary Examiner*—Nay Maung
*Assistant Examiner*—Philip J. Sobutka

(57) ABSTRACT

A wireless communications system (40b) capable of delivering Time Of Arrival (TOA) positioning data to at least one externally operated and maintained requesting agent (12), including a gateway (14a, 14b) to the external agent (12), which provides an interface to the requesting agent (12). The system (40b) also includes a Base Station Subsystem (BSS) (62) and an array of Location Management Units (LMUs) (24). The BSS (62) serves at least one mobile set (26) for which TOA positioning data is requested and is accessible by the requesting agent (12) through the gateway (14a, 14b). The LMUs (24) are configured to compute positioning coordinates for the mobile set (26), wherein the BSS (62) includes positioning functions (16) are moved to the BSC (20) or integrated within the BTS (22) so that control of the LMUs (24) is accomplished at the BSS (62).

23 Claims, 3 Drawing Sheets

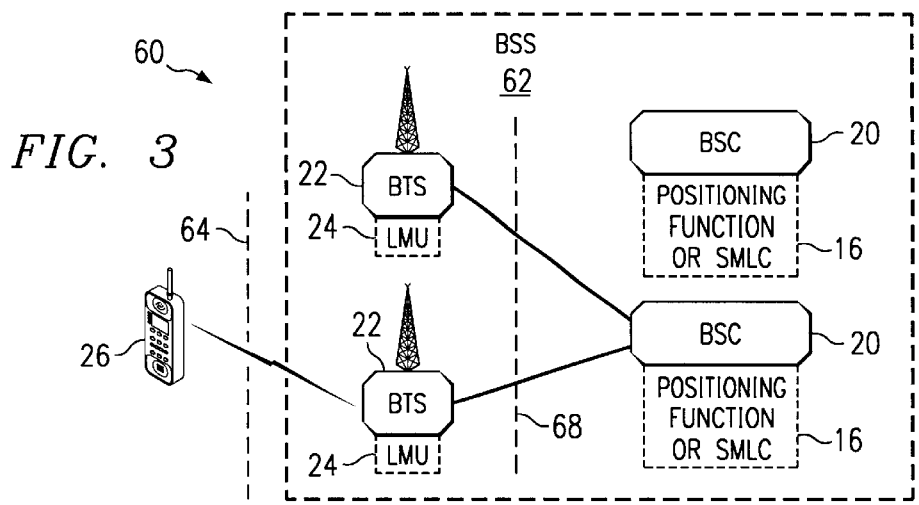
FIG. 3
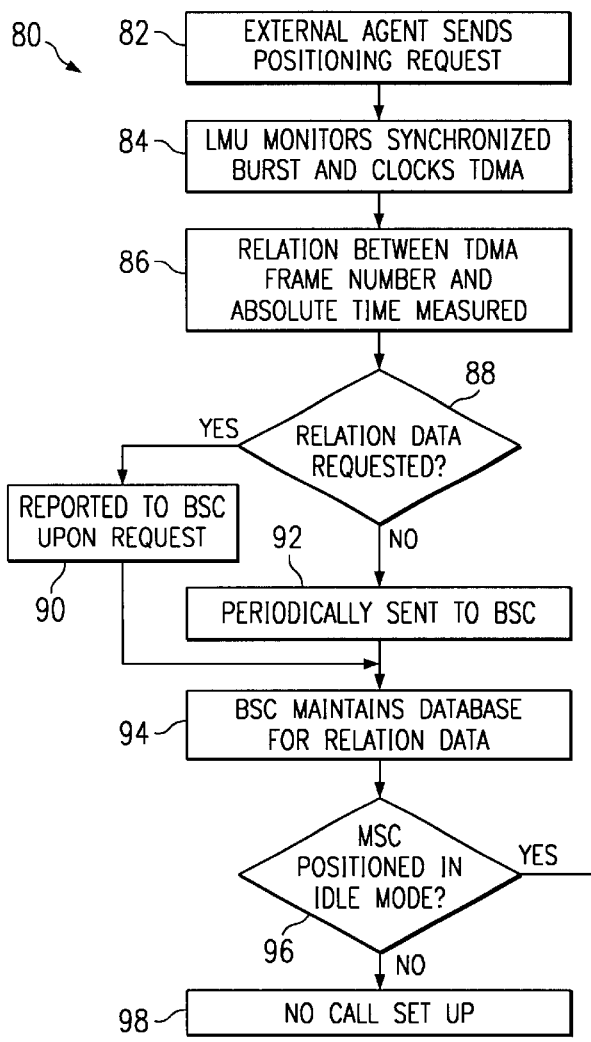
FIG. 4
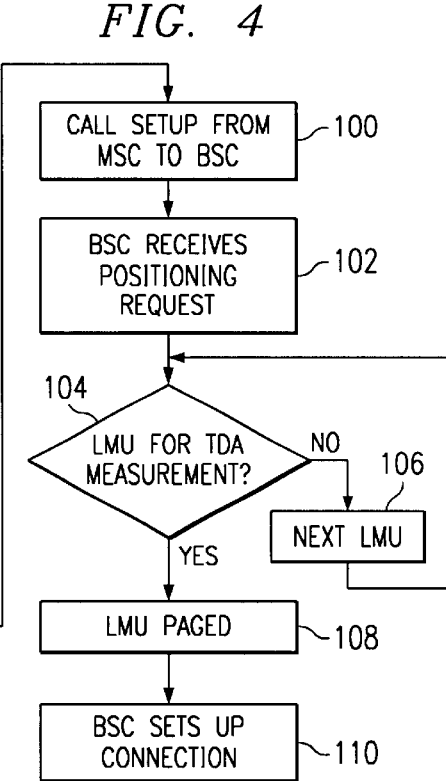

ARCHITECTURE FOR TOA POSITIONING WITH LMU CONTROL FUNCTIONALITY IN BSC

TECHNICAL FIELD

This invention relates generally to cellular communications and applications, and more particularly to a method and system of delivering Time Of Arrival (TOA) positioning data to at least one externally operated and maintained requesting agent.

BACKGROUND OF THE INVENTION

The increased demand for wireless (or cellular) communications has resulted in advanced communications systems capable of providing a high quality of service to more users. The systems that have emerged include analog systems as Advanced Mobile Phone System (AMPS), and digital systems such as the Global System for Mobile Communications (GSM) and Digital AMPS (D-AMPS). To implement these systems, cellular based communication devices operate in interference-limited environments, that rely on frequency reuse plans to maximize capacity and quality. Protocols such as the Frequency Division Multiple Access (FDMA) in analog systems, and the Time Division Multiple Access (TDMA) in digital systems are used for this purpose.

In traditional wire line telephone systems, such as the Public Switched Telephone Network (PSTN), location of the telephone user was facilitated by associating the user with a service location. In wireless environments, determining the location of the user is much more complex since roaming within the network is permitted. Typically, triangulation systems are employed to permit positioning as a function of signal strength from at least three receiving entities in the network.

As the use of Wireless communication systems increases, so does the importance of determining the location or "positioning" of users within the network. Positioning algorithms and systems are being developed and used to calculate and render positioning coordinates of a user. At the same time, positioning has become mandated by government agencies (i.e., FCC) as a standard to be implemented as early as the year 2001. In order to prepare for such implementation, the industry as a whole has been working on this effort as evidenced in Reference RTS/SMG-030378QR1 (Digital cellular communication system (Phase 2+); Location Services (LCS); GSM).

The Time of Arrival (TOA) positioning mechanism is based on collecting time of arrival (TOA) measurements computed from access bursts generated by the mobile set. Access bursts are generated during intracell handover and are received and measured by both serving and neighboring base stations. Utilizing access bursts to position the mobile requires additional hardware at the listening BTSs to accurately measure the TOA of the bursts.

A problem with prior art, positioning systems is that the current TOA positioning architecture is based on communication of Location Management Unit (LMU) and the Serving Mobile Location Center (SMLC) over an air interface using Direct Transfer Access Protocol (DTAP) messages. In this regard, the SMLC is used to describe a set of functions that are responsible for forming the DTAP messages and communicating with the LMUs in the network. This fundamental design basis places control of the LMU outside the BTS with no hardware change required on the BTS. Thus, communication between the LMU and SMLC is exclusively over the air interface by DTAP messages with no direct communication.

This distance between the LMU and BTS has a number of disadvantages. Primarily, the Operations and Management (O&M) portion of the network becomes complex since the DTAP message stream must pass several entities within the network. A dedicated channel must be assigned, setup and used to control the LMU designations creating overhead and latency. Since mobiles are often roaming, the added overhead can result in less than the most accurate positioning coordinates for a particular mobile. Additionally, the use of a separate channel ties up network resources which could be better utilized to service customers and increase network capability.

SUMMARY OF THE INVENTION

The present invention provides a method and related system of placing a portion of the positioning functions (referred to generally as SMLC) within the BSC portion of the network. Time Of Arrival (TOA) positioning data is delivered to at least one externally operated and maintained requesting agent with a simplified Operations and Maintenance (O&M) for more efficient positioning. Decreased load in the network without tying up unnecessary network resources are some of the advantages.

Disclosed in one embodiment is a system which is capable of delivering Time Of Arrival (TOA) positioning data to at least one externally operated and maintained requesting agent. The system comprises a gateway which provides an interface to the requesting agent. The system also comprises a Base Station Subsystem (BSS), including a Base Transceiver Station (BTS) and a Base Station Controller (BSC). The BSS serves at least one mobile set for which TOA positioning data is requested by the requesting agent via a message transmitted through the gateway.

The BSC can be adapted to maintain a database for relating TDMA number/absolute time for each cell and to receive a positioning via a Master Switching Center (MSC) BSSMAP message. The BSC can be further adapted to determine which LMUs are appropriate for TOA measurement and positioning, where the LMUs are adapted to measure the TOA of HO bursts generated by the mobile and send the result to the BSC.

The BSC can be further adapted to determine and assign channels for positioning handover, as well as to set up a connection to LMUs using the IMSI of the LMUs. The BSC can also be adapted to configure the LMUs for TOA measurement consisting of at least the following configuration data: frequency list, hopping sequence, and absolute time. The BSC can be further adapted to order the mobile to perform positioning handover on the selected channel, pack all measurements from different LMUs and send the composition to the requesting positioning function where final calculation of the mobile positioning coordinates is achieved.

The system further comprises an array of Location Management Units (LMUs) configured to facilitate the computation of positioning coordinates for a mobile set, where the BSS has been equipped with a portion of the Serving Mobile Location Center functions and adapted to determine which of the LMUs are appropriate for making TOA measurements. Specifically, the LMUs are adapted to monitor access bursts and clock the Time Division Multiple Access (TDMA) number with its absolute time. The relation between TDMA frame number and absolute time can then be periodically reported to the BSC by setting up a SDCCH connection where an LMU indicates a new Establishment cause when sending the Channel request. Alternatively, the BSC can request the relationship and time data.

Also disclosed is a method of delivering Time Of Arrival (TOA) positioning data to at least one externally operated and maintained requesting agent. The method comprises the steps of monitoring the synchronization access burst of a mobile and clocking the Time Division Multiple Access (TDMA) number with its absolute time. The relation between the TDMA frame number and the absolute time is then reported to the Base Station Controller (BSC) which could be periodically sent to the BSC or could be reported upon BSC request, according to various embodiments. The relation of TDMA frame number and absolute clock time is reported to the BSC periodically, by setting up a Stand-alone Dedicated Control Channels (SDCCH) connection wherein the LMU indicates a new Establishment cause when sending the Channel request. This relation can be obtained by monitoring the synchronization channel (on the Broadcast Control Channel) (BCCH) or by performing a handover.

The method can also comprise the step of maintaining a database for relation a TDMA number/absolute time for each said cell. This database can be maintained on the BSC. Each cell has a dedicated LMU to report the relation between TDMA frame number and absolute (GPS) time.

The method can further comprise the step of receiving a positioning request via a Mobile Switching Center (MSC) a BSSMAP message. The Positioning Request is received by the BSC and is sent from the MPC to the BSC via the MSC. If the mobile to be positioned is in idle mode, the MSC sets up a call prior to sending the positioning request to the BSC.

The method can further comprise the step of determining which LMUs are appropriate for TOA measurement used in positioning. The LMUs can be adapted to measure the TOA of access bursts generated by the mobile. Based on prevailing radio conditions for the mobile, the appropriate LMUs to be involved are selected by the BSC. The existing locating algorithm (used for cell selection for handover) can be used for this purpose. In addition, a predefined set of neighboring cells (LMUs) can complement the candidate cells (LMUs) selected by locating algorithm.

The method can further comprise the step of determining and assigning channels for positioning handover. The BSC selects a channel for positioning handover with the first choice being the same channel. If the mobile can not handle that, in case of failure due to mobile capability, another channel should be selected. When a positioning emergency occurs, it may be advantageous to select another channel as a first choice. If there is not TCH available, SDCCH should be used.

The method may further comprise the step of setting up a connection to the LMUs by using the IMSI of the LMUs. The BSC sets up a connection for each of the LMUs selected for TOA measurement. This is achieved using the IMSI number of LMUs. For connection, each LMU is paged and set-up is performed.

The method can also comprise the step of ordering the mobile to perform positioning handover on the selected channel. The BSC orders the mobile to perform positioning handover on the selected channel. When the configuration LMU is finished, the process is resumed by sending a Handover Command to the mobile. The Handover Command can specify that handover should be asynchronous as well as the TDMA frame number in which the mobile should start sending access bursts. The BSC predicts this time as the starting time of LMU measurement with the starting time included in the configuration message, and the corresponding FN included in the Handover Command.

A technical advantage of the present invention includes keeping the LMU either outside the BTS or integrated within the BTS to limit the waste of radio resources. By integrating a portion of the positioning or SMLC functionality within the BSC, reduced complexity and improved positioning efficiency is achieved. Since the radio functions in network inherently reside in the BSC, it can be utilized for more efficient positioning.

Another technical advantage of the present invention is reduced complexity of the O&M as the LMU and BSC can communicate directly. The basis for this solution is that the LMUs could be handled by the BSC as a normal network mobile. Furthermore, the BSC is better suited for LMU selection. Thus, by moving a portion of the positioning functions (or SMLC functionality) to the BSC, TOA positioning is quicker.

Other technical advantages include less load in the network, as well as ease in migration of the positioning functions near to or integrated with the BSC.

BRIEF DESCRIPTION OF THE DRAWINGS

The above features and advantages of the present invention will be more clearly understood from consideration of the following detailed description taken in connection with accompanying drawings in which:

FIG. 3 illustrates the components of the BSS with the positioning function (or SMLC functionality) according to one embodiment of the invention;

FIG. 4 is a process flow diagram of TOA positioning architecture method according to one embodiment.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
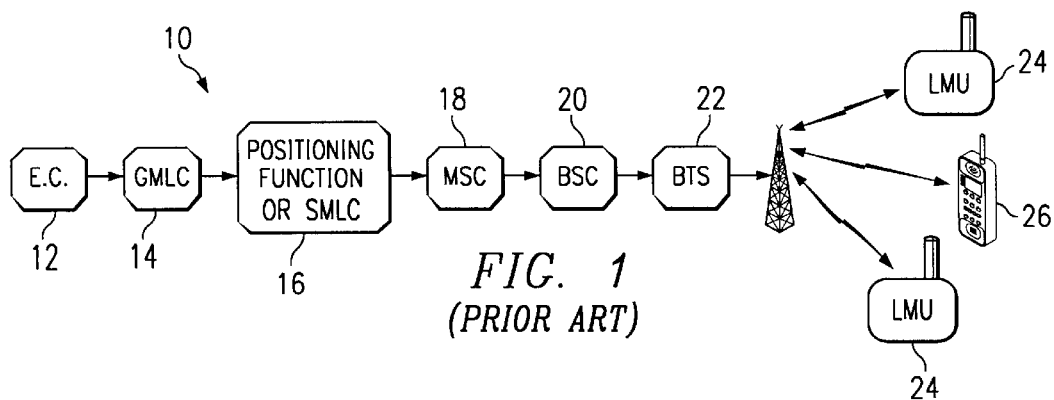
FIG. 1 illustrates typical TOA positioning architecture.

To better understand the invention, reference is made to FIG. 1 which depicts typical TOA positioning architecture 10 as referenced in prior art. The TOA positioning architecture 10 includes an external component 12, or requesting agent, which sends a request via Direct Transfer Access Protocol (DTAP) messaging to the Gateway Mobile Location Center (GMLC) 14 in a Global System for Mobile (GSM) network. Positioning is initiated at the GMLC 14 then forwards the request to the network based Serving Mobile Location Center (SMLC) 16.

The positioning algorithms are indicated as the Serving Mobile Location Center (SMLC) 16. That is, the SMLC 16 decides what LMUs 24 should be involved in the TOA positioning process. While the invention is described throughout in connection with an SMLC 16, it should be understood that any positioning of mobile function or functions are referred to and incorporated herein according to various positioning algorithms, systems and methodologies known to those of ordinary skill in the art. As such, the terms "SMLC" and "positioning function" shall be used interchangeable throughout.

The LMU 24 coordinates are then used to calculate measurement of the desired position. Once the LMUs 24 have been selected for TOA positioning, the information is routed to the Mobile Switching Center (MSC) 18. The MSC 18 provides all the functionality needed to handle a mobile subscriber, such as registration, authentication, location updating, handovers, and call routing to a roaming subscriber.

The Base Station Controller (BSC) 20, as a component of the Base Station Subsystem (BSS), then orders the mobile 26 to handover (HO). The BSC 20 manages the radio resources for one or more BTSs 22. It handles radio channel set-up, frequency hopping, and handovers. The BSC 20 is the connection between the mobile 26 and the MSC 18. The Base Transceiver Station (BTS)22, as the other component of the BSS, houses the radio transceivers that define a cell and handles the radio-link protocols with the Mobile 26. In a large urban area, there will potentially be a large number of BTSs 22 deployed. The requirements for a BTS 22 are ruggedness, reliability, portability, and minimum cost.

Figure 2A:
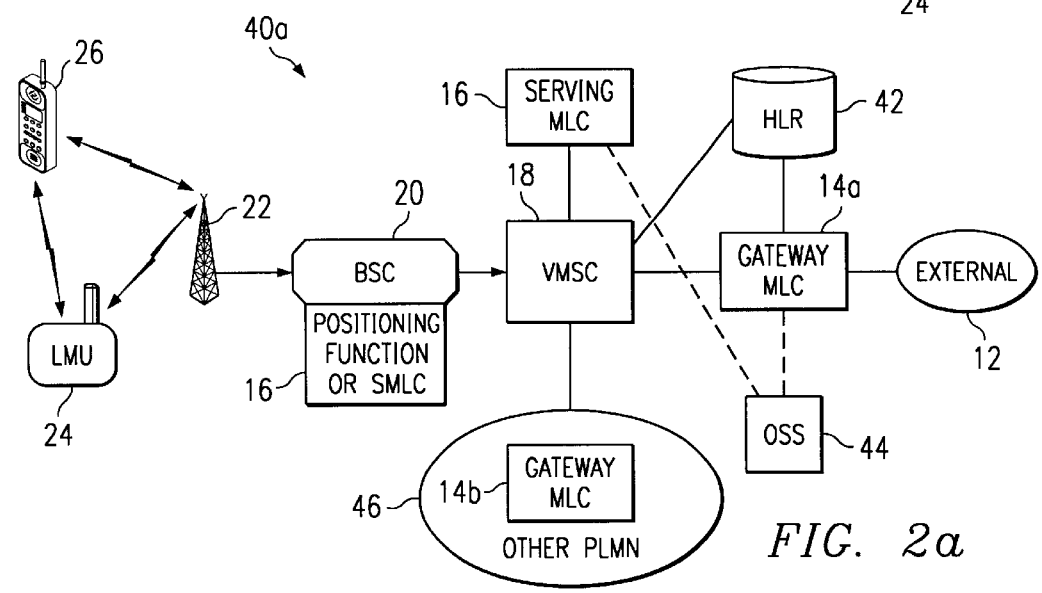
FIG. 2a shows the logical architecture for TOA positioning method with SMLC functionality in BSS according to one embodiment.

The architecture for TOA positioning system, according to one embodiment of the invention, is shown and denoted generally as 40a in FIG. 2a. As shown, the architecture for TOA positioning 40a includes a portion of the mobile positioning function 16 functionality integrated or closely coupled to the BSC 20. The architecture for TOA positioning 40a, also referred to as a wireless communications system, is capable of delivering Time Of Arrival (TOA) positioning data to at least one externally operated and maintained requesting agent 12. The external component 12 of the system 40a sends a request for positioning via a GMLC 14a. The GMLC 14a provides an interface to the requesting agent 12. The GMLC 14a also contains functionality required to support Location Services (LCS).

In the Public Land Mobile Network (PLMN) 46, there may be more than one GMLC 14b. Thus, GMLCs 14a and 14b provide the entry nodes an external LCS client uses to access the PLMN 46. The GMLCs 14a, 14b may request routing information from the Home location Register (HLR) 42 via an interface. After performing registration authorization, it sends the positioning requests to and receives final location from the VMSC 18 via an interface. Once the positioning request has been processed by the VMSC 18, the VMSC 18 communicates with the BSC 20 with positioning function 16. The positioning function 16 contains the algorithms, methods and systems required to support LCS. The positioning function 16 manages the overall coordination and scheduling of resources required to perform positioning of a mobile. It also calculates the final location estimate and accuracy.

Furthermore, the positioning function 16 controls a number of LMUs 24 for the purpose of obtaining radio interface measurements to locate or help locate Mobile 26 subscribers in the area that it serves. The positioning function 16 is administered with the capabilities and types of measurement produced by each of its LMUs 24. Signaling between an positioning function .16 and LMU 24 is transferred via the MSC 18 serving the LMU 24 using an air interface. The measurements returned by an LMU 24 to an positioning function 16 have a generic status in being usable for more than one positioning method.

Alternatively, the positioning function 16 and GMLCs 14a, 14b functionality may be combined in the same physical node, combined in existing physical nodes, or reside in different nodes. The positioning function 16 and GLMC 14a, 14b are not interconnected, but further are connected through the VMSC 18. When the VMSC 18 and GMLCs 14a, 14b are in different PLMNs 46, they are interconnected via an air interface.

Figure 2B:
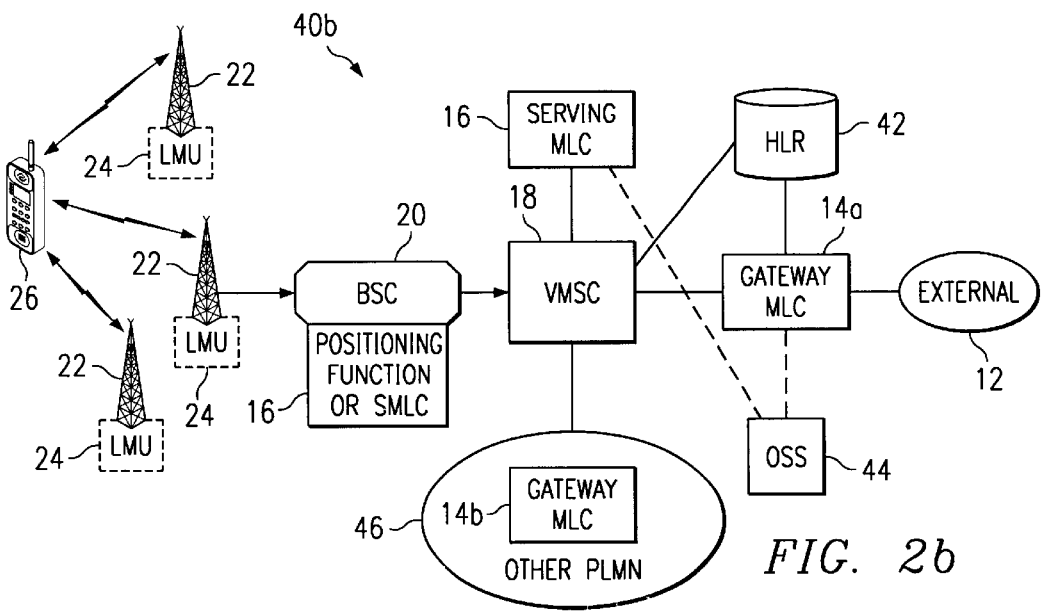
FIG. 2b shows the logical architecture for TOA positioning method with LMUs integrated into BTS according to one embodiment.

With reference to FIG. 2b, an alternate architecture for TOA positioning system 40b with LMUs 24 integrated into the BTS 22 is shown, according to another embodiment. The system 40b is capable of delivering TOA positioning data to at least one externally operated and maintained requesting agent 12. The TOA positioning system 40b is configured to Time Of Arrival (TOA) measurements computed form access bursts generated by the Mobile 26. These bursts are generated by having the Mobile 26 perform an asynchronous intracell handover. Access bursts are received an measured by serving and neighboring base stations.

A gateway 14a to the external agent 12 provides an interface to the requesting agent 12. A Base Station Subsystem (BSS) 62 including a BTS 22 and a BSC 20 serves at least one mobile set 26 for which TOA positioning data is requested. The BSS 62 is further communicably accessible by the requesting agent 12 through the gateway 14a.

An array of Location Management Units (LMUs) 24 configured to compute positioning coordinates for the mobile set 26 are integrated into the BTS 22. Furthermore, the BSS 62 includes those portions of the positioning function 16 adapted to determine which of the LMUs 24 are appropriate for making TOA measurements used in positioning of the NS 26. That is, once the Mobile 26 has released an access burst, the distance from the Mobile 26 to the BSC 20 is measured and time determined. The BSC 20 then decides the amount of time for which a handover needs to be made.

An LMU 24 makes radio measurements to support one or more positioning methods. These measurements fall into one of two categories: Location measurements specific to one Mobile 26 used to compute the location of this Mobile 26; or Assistance measurements specific to all Mobile 26 in a certain geographic area. All location and assistance measurements obtained by an LMU 24 are supplied to a particular Positioning function 16 associate with the LMU 24. Instructions concerning the timing, the nature and any periodicity of these measurements are provided by the Positioning function 16 or are pre-administered in the LMU 24.

All signaling to an LMU 24 is exclusively over the GSM air interface. There is no wired connection to any other network element. An LMU 24 thus has a serving BTS 22, BSC 20, MSC 18 and HLR 42 in addition to an Positioning function 16 and interacts with the first four of these like a normal mobile 26. In particular, an LMU 24 has its own IMSI and interface that are necessary components to the LMU 24 procedures.

To ensure that the LMU 24 and its associated Positioning function 16 can always access one another, an LMU 24 maybe homed camped) on a particular location area (or location areas) belonging to one MSC 18. For real LMUs 24, the HLR 42 contains a special profile indicating no supplementary services. An identifier in the HLR 42 also distinguishes an LMU 24 from a normal Mobile 26. All other data specific to an LMU 24 is administered in the LMU 24 associated in its associated positioning function 16.

FIG. 3 is a block diagram illustrating the BSS 62 with the positioning function 16 or a portion thereof and the LMUs 24 integrated into a corresponding BTS 22. The mobile 26 is typically a cellular telephone that is carried by the subscriber. The mobile 26 and the BSS 62 communicate with one another across an interface 64, known as the air interface (or radio link, or Um interface). The mobile 26 usually includes a mobile transceiver and a Subscriber Identity Module (SIM). The SIM may include an identity indicator (a "secret" key for authentication), or other relevant network/user information. The mobile transceiver itself is uniquely identified by the International Mobile Equipment Identity (IMEI—typically, a telephone number). The identification features of the mobile 26 are independent, thereby allowing mobility of the user about the service area of the GSM network.

The BSS 62 typically comprises two parts: the BTS 22 (commonly called a base station), and the BSC 20. The BTS 22 communicates across a standardized Abis interface 68 with BSC 20, allowing operation between the components. BTS 22 houses radio transceivers that communicate across a cell, and the BTS 22 handles the radio-link protocols that facilitate communication with the mobile station 26. BSC 20 manages the radio resources for one or more BTSs 22, and, likewise, there may be several BSCs 20 within a single BSS 62. BSC 20 provides a communications platform between the mobile station 26 and the MSC 18 of a network subsystem which acts as an interface to one or more networks 46. Among the functions of the BSC 20 are radio-channel setup, frequency hopping, and handovers.

The present invention moves the positioning function 16 or a portion thereof to the BSC 20. This allows for the external agent 12 to send its request directly to the MSC 18 via a GMLC 14. The request is then routed to the BSS 62 where the positioning function 16 is processed and implemented at the BSC 20. In doing so, complexity in MLC is reduced and positioning efficiency is improved. Furthermore, according to one embodiment of the present invention, the LMUs 24 are integrated into the BTS 22, or the LMUs 24 may stand alone.

With reference to FIG. 4, therein is shown a process flow diagram, denoted generally as 80, for a method of delivering Time Of Arrival (TOA) positioning data to at least one externally operated and maintained requesting agent 12 according to one embodiment of the present invention. The process 80 begins at step 82 where an external agent 12 sends a positioning request to an array of LMUs 24. Each LMU 24, at step 84, then monitors the synchronization burst of its cell and clocks the Time Division Multiple Access (TDMA) number with its absolute (GPS) time.

The relation between the TDMA frame number and the absolute time is then reported to the BSC 20 at step 86. This could be periodically sent to the BSC 20 at step 92, or could be reported upon BSC 20 request at step 90, once a decision is made at step 88. The relation of TDMA frame number and absolute clock (GPS) time is reported to the BSC 20 periodically, by setting up a Stand-alone Dedicated Control Channels (SDCCH) connection where the LMU indicates a new Establishment cause when sending the Channel request. Note that the Mobile services Switching Center (MSC) will not be involved in this procedure. This relation can be obtained by monitoring the synchronization channel (on the Broadcast Control Channel) (BCCH) or by performing a handover to the same cell.

Once the BSC 20 receives the relation data, step 94 allows the BSC 20 to maintain a database for relation TDMA number/absolute time for each cell. Each cell has a dedicated LMU to report the relation between TDMA frame number and absolute (GPS) time. This information is kept and maintained in a database in the BSC 20.

The Positioning Request is then sent from MPC (MLC) to the BSC 20 via MSC. If the mobile 26 to be positioned is in idle mode at step 96, the MSC sets up a call at step 100 prior to sending the Positioning Request to the BSC 20. If the MSC to be positioned is not in idle mode at step 96, no call is set up at step 98. At step 102, the BSC 20 then receives a positioning request from a Mobile Location Centre (MLC) via a Mobile Switching Center (MSC) BSSMAP message.

From the positioning request, the BSC 20 then determines, at step 104, the LMUs appropriate for TOA measurement for positioning. Based on prevailing radio condition for the mobile (to be positioned), the appropriate LMUs to be involved are selected by the BSC 20 (e.g. existing locating algorithm complemented with positioning neighbors can be used). The existing locating algorithm (used for cell selection for handover) can be used for this purpose. In addition, a predefined set of neighboring cells (LMUs) complements the candidate cells (LMUs) selected by locating algorithm.

The LMUs are adapted to measure the TOA of HO bursts generated by the Mobile and to send the result. Therefore, if an LMU is not selected for TOA measurement and positioning at step 104, then the BSC 20 goes to the next LMU at step 106 for selection determination at step 104. If, however, the LMU is selected by the BSC 20 for TOA measurement, each selected LMU is paged at step 108 and set up via connection is performed at step 110. Connection to the LMUs at step 110 is achieved by using the IMSI of the LMUs.

Figure 5:
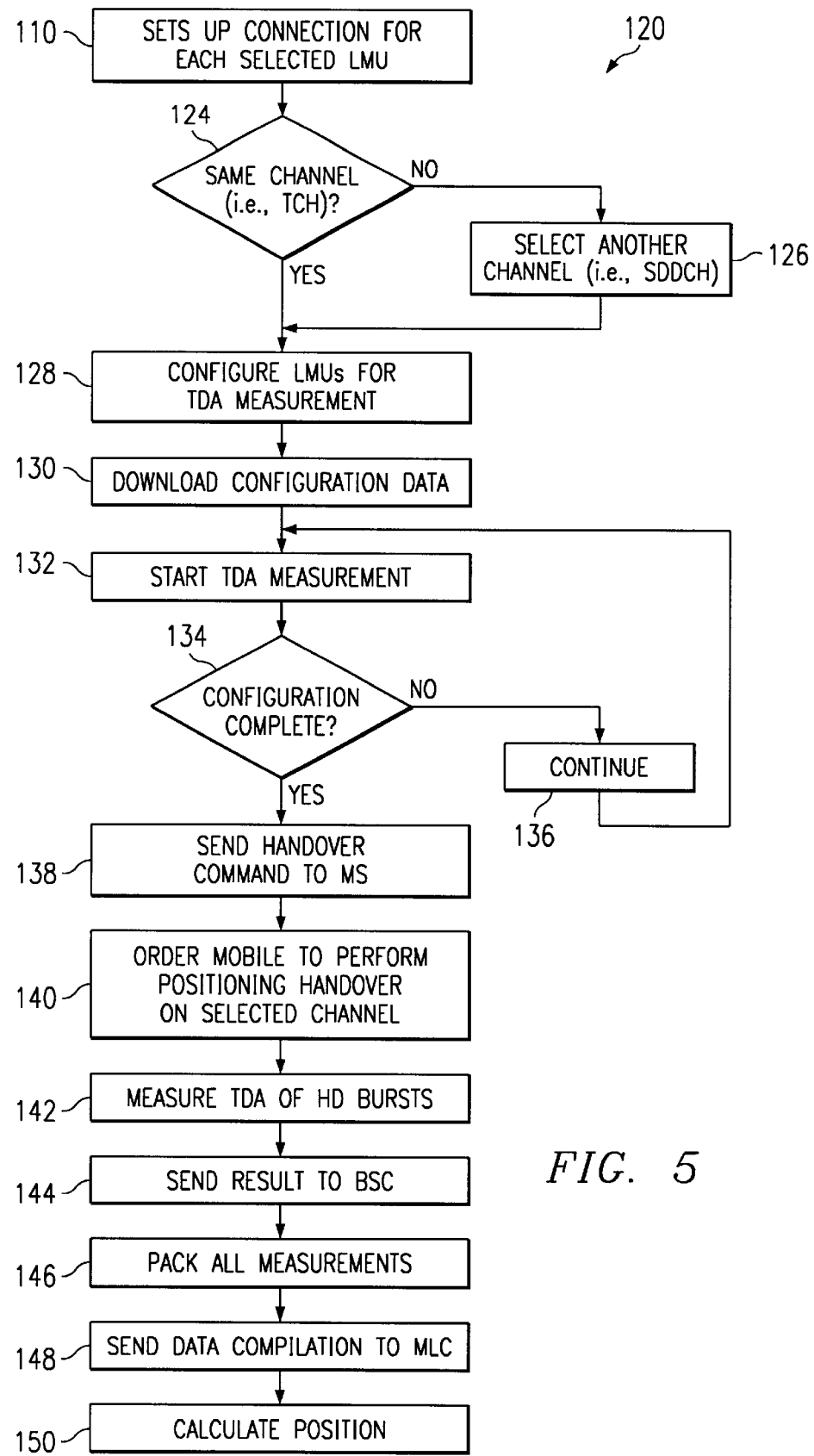
FIG. 5 is a continuation of the process flow diagram of TOA positioning once connection for each LMU is set up.

With reference to FIG. 5, therein is shown a continuation of process 80 in a process flow diagram denoted generally as 120. Once connection for each selected LMU is set up at step 110, the BSC 20 determines the channel that positioning handover will be made to at step 124. The first choice should be the same channel. If the Mobile can not handle the request in case of failure due to overload of the network, another channel should be selected at step 126. When positioning emergency request is received, it may be advantageous to select another channel as a first choice. Therefore, if there is no TCH available, SDCCH should be used.

After selection of the appropriate channel by the BSC 20 at step 124, the process flow is directed to step 128 for configuration of the LMUs for TOA measurement. Such configuration is accomplished by the BSC 20 for TOA measurement consisting of configuration data (e.g., frequency list, channel description, hopping parameters, start time, etc.). Once the BSC 20 has completed connections to the selected LMUs, the configuration data is downloaded to the LMUs at step 130.

Next, at step 132, the involved LMUs start the TOA measurement at the start time provided in the configuration step by BSC 20. If configuration LMU is complete at step 134, the process is resumed by sending a Handover Command to the Mobile at step 138. If the configuration LMU is not finished, such configuration will continue at step 136. The BSC 20 then orders the mobile to perform positioning handover on the selected channel at step 140. The Handover Command specifies that the handover should be asynchronous.

Also, the TDMA frame number in which the Mobile should start sending access bursts is specified. Notice that this time shall correspond to the absolute time in which the LMUs start the TOA measurement. The BSC 20 predicts this time as the starting time of LMU measurement. The starting time is included in the configuration message, and the corresponding FN is included in the Handover Command to the mobile. The LMUs then measure the TOA of HO bursts generated by the Mobile at step 142. After the signal processing and application of multi-path rejection algorithm on received/measured bursts, the LMUs reports the TOA to the BSC 20 at step 144. The channel that was used to download the configuration data can also be the channel used to report the result of the measurement.

After receiving the results, the BSC 20 then packs all TOA measurement data from different the LMUs at step 146 and sends the compilation of data to the MLC (MPC) via MSC at step 148, where the position is calculated. The position is calculated in MLC at step 150 and provided to application. Alternatively, the BSC 20 can calculate the position and send the result to the MLC via MSC. The position calculation in the BSC 20 can be beneficial for radio network improvement and optimization applications.

The solution presented by the present invention for TOA positioning includes keeping the LMU in close proximity to the BTS 22 (the fundamental constraints) according to one embodiment. That is, one embodiment of the present invention provides for a portion of the SMLC or positioning functionality to be located in the BSC 20 resulting in reduced complexity in MLC and improved positioning efficiency. Alternatively, the positioning functions 16 can be integrated into the BTS 22 so that the relevant messages are routed to the BTS 22 rather than being sent transparently through the BTS 22, over an air interface to the LMU. The fact that the positioning functions 16 are moved to or integrated within the BSC 20 or BTS 22 provides the advantages of reduced overhead and better utilization of network resources since the air interface to the LMUs is avoided.

The radio functions in a wireless GSM network inherently reside in the BSC 20 and can be utilized for positioning purpose as well. Furthermore, the Operations and Maintenance (O&M) complexity is also reduced as the LMU and BSC 20 can communicate directly. The basis for this solution is that the LMU could be handled by BSC 20 as a normal GSM mobile.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A wireless communications system capable of delivering Time Of Arrival (TOA) positioning data to at least one externally operated and maintained requesting agent said system comprising:

a gateway to said external agent said gateway providing an interface to said requesting agent;

a Base Station Subsystem (BSS), including a Base Station Controller (BSC), serving at least one mobile set for which TOA positioning data is requested, said BSS accessible by said requesting agent through said gateway; and an array of Location Management Units (LMUs) configured to compute positioning coordinates for said mobile set wherein each said LMU is adapted to monitor a synchronization burst from a cell associated with said LMU for clocking a Time Division Multiple Access (TDMA) frame number against said frame number s absolute time, the relation between said frame number and said absolute time being sent to said BSC periodically wherein each said LMU indicates a new establishment cause when sending a channel request or when said channel request is sent in response to a BSC request.

wherein said BSS Includes a set of positioning functions adapted to determine which of said LMUs are appropriate for making TOA measurements for positioning of said mobile set.

2. The system of claim 1 wherein said channel request is a Standalone Dedicated Control Channel.

3. The system of claim 1 wherein said BSC is adapted to maintain a database for storing data regarding the relation between the TDMA frame number and the absolute time for said frame number for each said LMU associated cell.

4. The system of claim 3 wherein said BSC is further adapted to receive a positioning request from a Mobile Location Center (MLC) via a Mobile service Switching Center (MSC) Base Station Subsystem Mobile Application Part (BSSMAP) message.

5. The system of claim 3 wherein said BSC is further adapted to determine which LMUs are appropriate for TOA measurement.

6. The system of claim 3 wherein said BSC is further adapted to determine positioning handover channels.

7. The system of claim 3 wherein said BSC is further adapted to set up a connection to said LMUs by using the International Mobile Subscriber Identity (IMSI) of said LMUs.

8. The system of claim 3 wherein said BSC is further adapted to configure said LMUs for TOA measurement, said TOA measurement comprising configuration data including frequency list, hopping sequence, and absolute time.

9. The system of claim 3 wherein said BSC is further adapted to order the mobile set to perform a positioning handover on the selected channel.

10. The system of claim 3 wherein said BSC is further adapted to pack all measurements from different LMUs and send them to the MLC where the position is calculated.

11. In a wireless communications system, a method of delivering Time Of Arrival (TOA) positioning data to at least one externally operated and maintained requesting agent said method comprising the steps of:

receiving a positioning request from a Mobile Location Centre (MLC) via a Mobile service Switching Center (MSC) Base Station System Mobile Application Part (BSSMAP) message;

monitoring a synchronization burst of each Location Management Unit (LMU) in an array of LMUs and clocking a Time Division Multiple Access (TDMA) frame number with said frame number s absolute time;

maintaining a database for storing data regarding the relation between said TDMA frame number and said frame numbers absolute time for each said LMU's cell;

determining the LMUs appropriate for TOA measurement for said positioning and sending the result to a Base Station Controller, said LMUs adapted to measure the TOA of handover (HO) bursts generated by the mobile set and send the result to said BSC;

selecting a channel for positioning handover;

setting up a connection to said LMUs;

configuring said LMUs for TOA measurement wherein said TOA measurement comprises configuration data;

ordering the mobile set to perform positioning handover on the selected channel; and packing all measurements from different LMUs and sending them to the MLC where the position is calculated.

12. The method of claim 11 further comprising the step of reporting the relation between said TDMA frame number and said frame number's absolute time to said BSC.

13. The method of claim 12 wherein said reporting step is performed by periodically transmitting the relation between said TDMA frame number and said frame numbers absolute time to said BSC by setting up a SDCCH connection where said LMU indicates a new Establishment cause when sending the Channel request or when said relation is reported in response to a BSC request.

14. The method of claim 11 further comprising the step of said BSC selecting said LMUs utilizing an existing locating algorithm.

15. The method of claim 14 wherein said selecting step comprises a predefined set of neighboring LMUs which complement the candidate LMUs selected by said locating algorithm.

16. The method of claim 11 wherein said step of determining said channel further comprises the step of selecting said channel as a first choice and selecting another channel if said mobile set is not capable of accommodating said first choice.

17. The method of claim 11 further comprising the step of said BSC setting up a connection to said LMUs.

18. The method of claim 17 further comprising the step of paging said LMUs for set-up to be performed.

19. The method of claim 11 further comprising the step of downloading said configuration data to said LMUs, said configuration data comprising: frequency list, channel description, hopping parameters, and start time.

20. The method of claim 11 further comprising the step of sending a Handover Command to said mobile set at the completion of said LMU configuration in order to resume said TOA process, said Handover Command adapted to specify that said handover should be asynchronous.

21. The method of claim 20 wherein said sending step specifies said TDMA frame number In which said mobile set should start sending access bursts, said time corresponding to the absolute time in which said LMUs start said TOA measurement.

22. The method of claim 11 further comprising the step of calculating the position of said mobile set and sending the result to said MLC via said MSC.

23. The method of claim 22 wherein said calculating step is performed in said BSC.

* * * * *